United States Patent
Burry et al.

(10) Patent No.: US 10,387,945 B2
(45) Date of Patent: Aug. 20, 2019

(54) SYSTEM AND METHOD FOR LANE MERGE SEQUENCING IN DRIVE-THRU RESTAURANT APPLICATIONS

(71) Applicant: CONDUENT BUSINESS SERVICES, LLC, Dallas, TX (US)

(72) Inventors: Aaron M. Burry, Ontario, NY (US); Peter Paul, Penfield, NY (US); Orhan Bulan, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 490 days.

(21) Appl. No.: 15/146,948

(22) Filed: May 5, 2016

(65) Prior Publication Data

US 2017/0323370 A1 Nov. 9, 2017

(51) Int. Cl.
*G06Q 30/06* (2012.01)
*G06Q 50/12* (2012.01)
*H04N 7/18* (2006.01)
*G06K 9/00* (2006.01)
*G06T 7/73* (2017.01)

(52) U.S. Cl.
CPC ..... *G06Q 30/0635* (2013.01); *G06K 9/00785* (2013.01); *G06Q 50/12* (2013.01); *G06T 7/74* (2017.01); *H04N 7/181* (2013.01); *G06T 2207/10016* (2013.01); *G06T 2207/30248* (2013.01)

(58) Field of Classification Search
CPC ................................................. G06Q 30/0635
See application file for complete search history.

(56) References Cited

U.S. PATENT DOCUMENTS

| | | | |
|---|---|---|---|
| 6,842,719 B1* | 1/2005 | Fitzpatrick | G06Q 10/06 340/286.09 |
| 6,940,393 B2 | 9/2005 | Dev et al. | |
| 7,895,797 B2 | 3/2011 | Bridgman et al. | |
| 8,401,230 B2 | 3/2013 | Kozitsky et al. | |
| 8,774,462 B2 | 7/2014 | Kozitsky et al. | |
| 9,760,800 B2* | 9/2017 | Reddy | G06F 13/28 |
| 9,977,972 B2* | 5/2018 | Khan | G06K 9/00651 |
| 2004/0260513 A1* | 12/2004 | Fitzpatrick | G06Q 10/06 702/182 |
| 2006/0218057 A1* | 9/2006 | Fitzpatrick | G06Q 10/04 705/28 |

(Continued)

*Primary Examiner* — Fateh M Obaid
(74) *Attorney, Agent, or Firm* — Gibb & Riley, LLC

(57) ABSTRACT

According to exemplary methods, automated image processing of images from order locations of a multi-lane drive-thru system is continually performed using an automated ordering system. It is automatically determined if a vehicle is present at any of the order locations based on the automated image processing. It is automatically determined if an order has been initiated into the automated ordering system. When the order has been initiated while the vehicle is present at any of the order locations, an automated sequencing processing is automatically begun. The automated sequencing processing determines an order pick-up sequence for picking up orders at pickup windows of the multi-lane drive-thru system. When the order has been initiated while the vehicle is not present at any of the order locations, a potential out-of-sequence warning is automatically associated with the order and output from the automated ordering system.

24 Claims, 17 Drawing Sheets

(56) References Cited

U.S. PATENT DOCUMENTS

| | | |
|---|---|---|
| 2007/0088620 A1 | 4/2007 | Tengler et al. |
| 2009/0255195 A1 | 10/2009 | Bridgman et al. |
| 2010/0042506 A1* | 2/2010 | Ravenel ............ G06F 17/30575 705/21 |
| 2010/0082569 A1* | 4/2010 | Cresto ................. G06Q 10/087 707/705 |
| 2012/0246007 A1 | 9/2012 | Williams et al. |
| 2013/0204719 A1* | 8/2013 | Burry ..................... G06Q 50/12 705/15 |
| 2015/0070471 A1 | 3/2015 | Loce et al. |
| 2015/0098621 A1* | 4/2015 | Bernal ................... G06Q 10/00 382/104 |
| 2015/0310365 A1* | 10/2015 | Li ....................... G06Q 10/0639 705/7.38 |
| 2015/0310370 A1 | 10/2015 | Burry et al. |
| 2015/0310615 A1* | 10/2015 | Bulan ................ H04N 5/23229 348/143 |
| 2015/0310624 A1 | 10/2015 | Bulan et al. |
| 2016/0100087 A1* | 4/2016 | Scheich ............. G06F 16/5862 348/47 |
| 2016/0155328 A1* | 6/2016 | Bernal ............... G06K 9/00785 382/104 |
| 2017/0323370 A1* | 11/2017 | Burry ................. G06Q 30/0635 |
| 2018/0082304 A1* | 3/2018 | Summerlin .............. G06N 3/04 |
| 2018/0253805 A1* | 9/2018 | Kelly ..................... G06Q 50/12 |

* cited by examiner

SYSTEM AND METHOD FOR LANE MERGE SEQUENCING IN DRIVE-THRU RESTAURANT APPLICATIONS

BACKGROUND

Systems and methods herein generally relate to flow sequencing and more particularly, to systems and methods to identify and warn of out of sequencing of a moving item as multiple source lanes merge into destination lanes.

Computerized systems are useful for improving efficiencies in many areas, such as facilitating movement of items through controlled lanes or paths. Examples of such systems include movement of items on conveyor systems in warehouses; queuing of individuals at airports, amusement parks, and sporting events; processing drive through (or "drive-thru") orders for food and other items at in-vehicle driving establishments; etc. The systems and methods herein will be described using the example of drive through ordering; however, these systems and methods are applicable to all types of processing where people or items merge from multiple source lanes into at least one destination lane.

In vehicle "drive through" operations customers can be served rapidly and cost effectively if certain functions are performed at multiple parallel stations (having respective lanes) and vehicles are merged to fewer lanes for stations that perform other functions. An example is a fast food restaurant having two or three parallel order stations, and a single lane for payment and food pick up. Inefficiencies and problems exist at the merge area following the parallel lanes. Currently, employees use video cameras and monitors to track the source lane of a vehicle as it crosses a merge line. This requires employee effort that could be used elsewhere and is subject to human error that wastes time and creates customer frustration at subsequent stations. This type of inefficiency can potentially translate into large amounts of lost revenue as backup in the drive-thru queue results in "drive-offs", "drive-arounds" and "drive-bys" in which potential customers choose to seek food elsewhere for fear of waiting too long in line.

Especially during high volume times of day, the merging of vehicles into a single lane can be a random process. This leads to the sequence of orders in the system being different from the actual sequence of vehicles in the queue that is approaching the payment and pickup windows. For example, a first driver in an outer lane may place an order, then stay at the order station searching for their wallet to pay, while a second driver in an inner lane places their order after the first driver, but then merges before the first driver—thus the order sequence will be different from the vehicle sequence. Unfortunately, this can lead to inaccuracy—cars being asked to pay the wrong amount or being given the wrong food—as well as inefficient restaurant operations as employees must reshuffle the sequence of drinks and orders that have already been prepared. In particular, crew behavior such as entering an order after the vehicle has left the order point can affect overall system accuracy.

SUMMARY

Video-based solutions for automating the sequencing of vehicles with orders have been developed. Unfortunately, the envisioned implementation for all of the various video-based methods is predicated on a trigger signal from the restaurant point of sale (POS) system when a member of the work crew begins to enter an order. In reality, given the large number of functions that each crewmember must juggle, it has been observed that orders are often started after a car has left the order station. For instance, a simple order may be memorized while a crewmember is performing another task and then entered into the POS after the car has been asked to pull forward in the queue. This breaks the paradigm of having a trigger signal for the vehicle while the car is still at the order station.

Systems and methods herein improve the robustness of video-based automated merge sequencing system to the inconsistent behavior of the restaurant crew. This is accomplished by using existing image capture cameras aimed at side-by-side order points to validate the presence, or absence, of a vehicle when an order is initiated by the crew member on the POS system.

A signal issued from the restaurant POS system when the order is started is input into the video-based system in order to trigger a vehicle detection and tracking process on the vehicle located at the order lane from which the order signal is originated. The limitation of the existing video-based approach is that, due to restaurant and crew behavior deviating from standard operating procedures, the trigger signals can be unreliable, and have been found to affect the performance of the automated system. The method performs video-based detection of vehicles at the order point (leveraging existing order-point cameras) and uses the detection information in conjunction with the trigger signal to detect potential out-of-order situations. If a potential out-of-order situation exists, an operator can take corrective action (e.g., issue potential out of sequence warnings to restaurant staff or adjust the internal tracking and queue management operations of the automated solution).

According to exemplary methods, automated image processing of images from order locations of a multi-lane drive-thru system is continually performed using an automated ordering system. It is automatically determined if a vehicle is present at any of the order locations of the multi-lane drive-thru system based on the automated image processing. It is automatically determined if an order has been initiated into the automated ordering system. When the order has been initiated while the vehicle is present at any of the order locations, an automated sequencing processing of the automated ordering system is automatically begun. The automated sequencing processing determines an order pick-up sequence for picking up orders at one or more pickup windows of the multi-lane drive-thru system. When the order has been initiated while the vehicle is not present at any of the order locations, a potential out-of-sequence warning is automatically associated with the order. The potential out-of-sequence warning is output from the automated ordering system.

According to exemplary methods, an area of interest is continuously monitored using an image capturing device. An order start signal being received at a point of sale (POS) system is determined. In response to the order start signal being received at the POS system, the presence of a subject in the area of interest is determined using the image capturing device. In response to detecting the presence of the subject in the area of interest, an order identification is assigned in the POS system and tracking of the subject is initiated. However, in response to failing to detect the presence of the subject in the area of interest, an alert is sent to the POS system indicating an out of sequence event.

Exemplary systems herein include a multi-lane drive-thru system having order locations, an image capturing device obtaining images from the order locations of the multi-lane drive-thru system, a processor connected to the image capturing device, and an automated ordering system connected to the processor. The image capturing device continuously monitors the order locations of the multi-lane drive-thru system. The processor performs automated image processing of the images and automatically determines if a vehicle is present at any of the order locations of the multi-lane drive-thru system based on the automated image processing of the images. The processor automatically determines if an order has been initiated into the automated ordering system. When an order has been initiated while the vehicle is present at any of the order locations, the processor automatically begins an automated sequencing processing of the automated ordering system. The automated sequencing processing determines an order pick-up sequence for picking up orders at one or more pickup windows of the multi-lane drive-thru system. When the order has been initiated while the vehicle is not present at any of the order locations, the processor automatically associates a potential out-of-sequence warning with the order, and outputs the potential out-of-sequence warning from the automated ordering system.

Exemplary systems herein include an image capturing device, a processor connected to the image capturing device, and a point of sale (POS) system connected to the processor. The image capturing device continuously monitors an area of interest. The processor determines an order start signal being received at the POS system. In response to the order start signal being received at the POS system, the processor determines the presence of a subject in the area of interest using the image capturing device. In response to detecting the presence of the subject in the area of interest, the processor assigns an order identification in the POS system and initiates tracking of the subject. In response to failing to detect the presence of a subject in the area of interest, the processor sends an alert to the POS system indicating an out of sequence event.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1A:
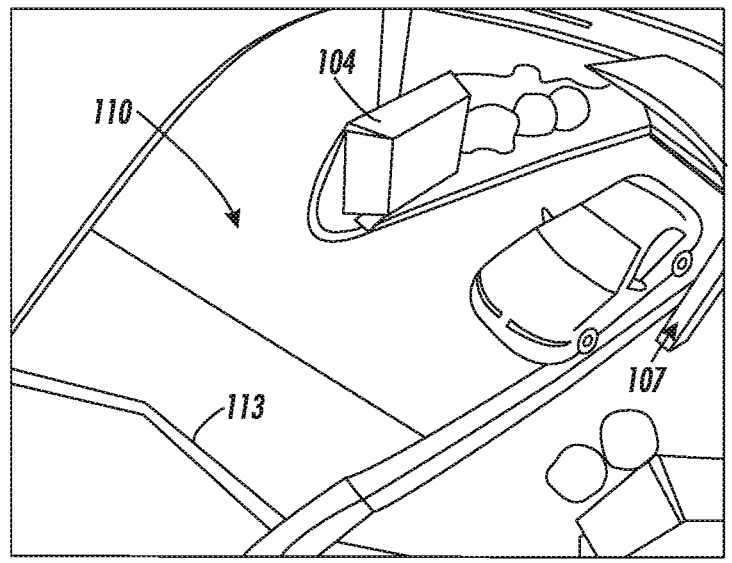
FIGS. 1A and 1B illustrate a typical drive-thru configuration at a restaurant.

For a general understanding of the features of the disclosure, reference is made to the drawings. It will be readily understood that the devices and methods of the present disclosure, as generally described and illustrated in the drawings herein, may be arranged and designed in a wide variety of configurations in addition to the devices and methods described herein. In the drawings, like reference numerals have been used to identify identical elements. While the disclosure will be described hereinafter in connection with specific devices and methods thereof, it will be understood that limiting the disclosure to such specific systems and methods is not intended. Thus, the following detailed description of the devices and methods, as represented in the drawings, is not intended to limit the scope defined by the appended claims. On the contrary, it is intended to cover all alternatives, modifications, and equivalents as may be included within the spirit and scope of the disclosure as defined by the appended claims.

Figure 1B:
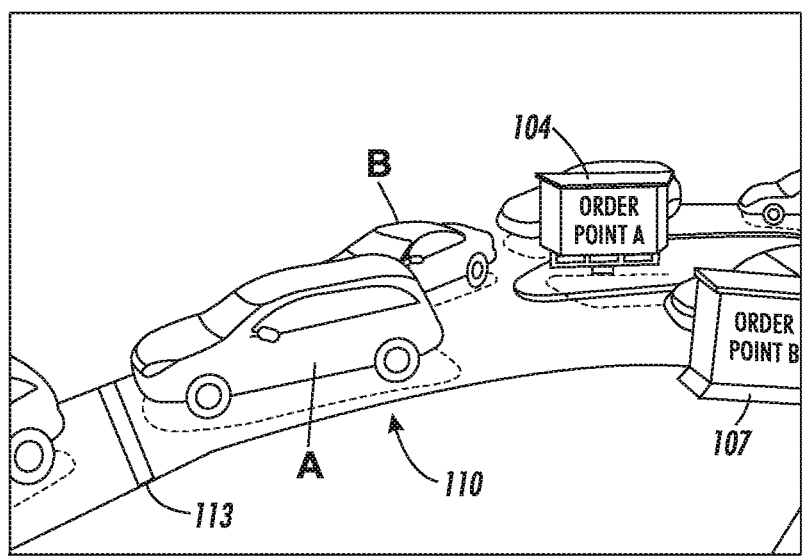

FIGS. 1A and 1B show an illustration of a typical drive-thru configuration, indicated generally as 101. The drive-thru configuration 101 has side-by-side order points 104 and 107, and a convergence area 110 in which a single lane is formed for subsequent payment and order pickup. The line 113 roughly represents the "merge point", beyond which, for the most part, vehicles will no longer change their merged sequence.

Figure 2:
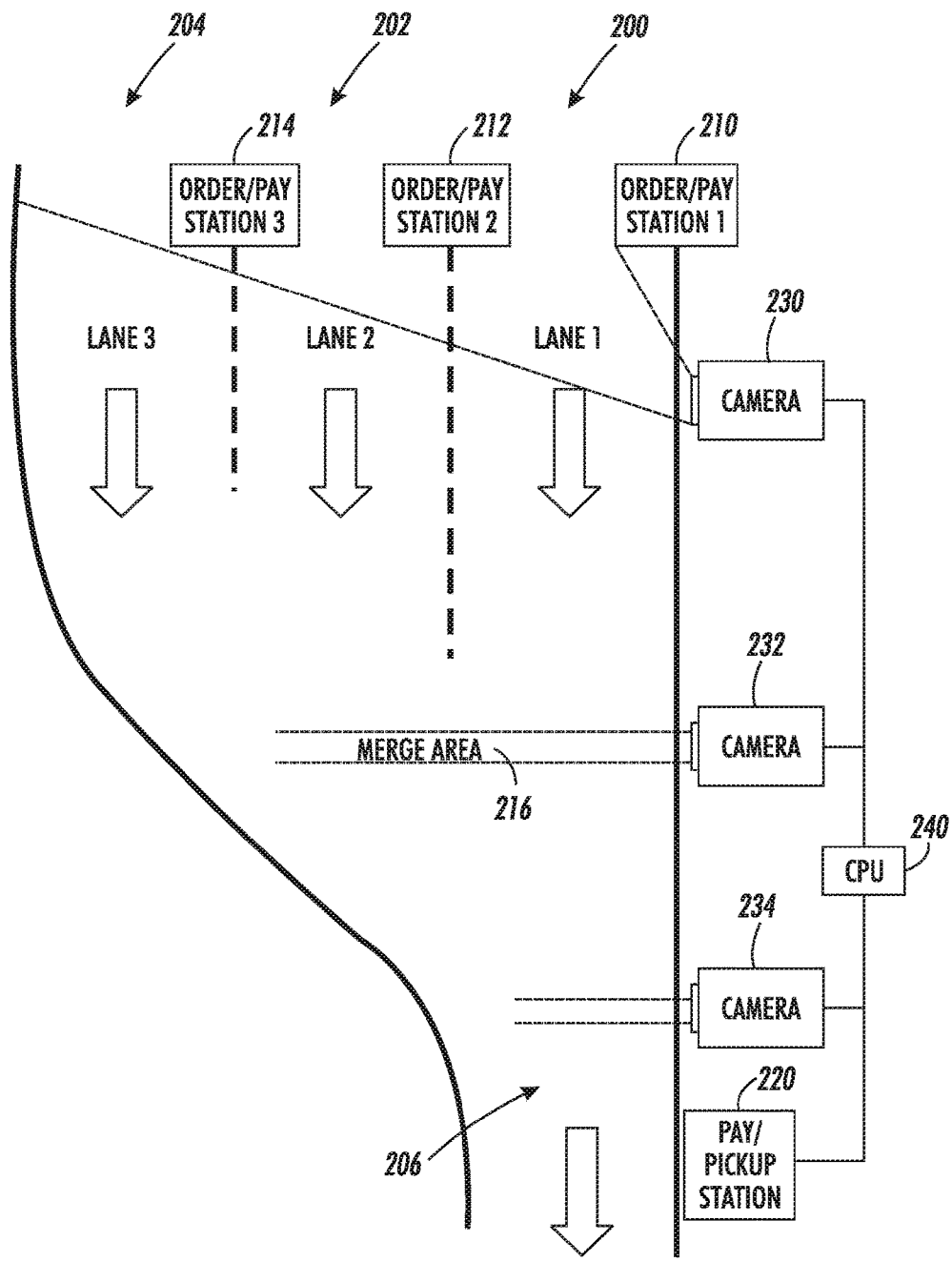
FIG. 2 illustrates a plan view of a merging scenario according to systems and methods herein.

FIG. 2 is a top-down view of a multi-lane drive-thru configuration 101 having three lanes 200, 202, 204 that merge into a single lane. While the illustrated examples are described in terms of a drive-through ordering system, other system where moving items (persons, inventory, bulk materials, etc.) may be included. Items 210, 212, and 214 represent devices where processing is initiated and can comprise, for example, order placement stations where orders are placed and potentially paid for. Item 230 represents a first image capturing device, such as a camera, obtaining images from the order locations of the multi-lane drive-thru system. Item 232 represents a second image capturing device, such as a camera, aimed at a merge area 216. Item 234 represents another image capturing device, such as another camera, that can be used to confirm the order of moving items in the merge lane 206. The multiple cameras of a camera network (or imaging devices of a stereo camera) may have fields of view that are fixed and overlap the areas of interest. The dual dotted lines represent the camera views of the cameras herein. Item 240 is a computerized device, such as central processing unit (CPU), or other type of processor of an automated ordering system. The merge line 113, shown in FIG. 1, is a physical or virtual line in real-world space (such as the merge area 216 shown in FIG. 2). The merge line 113 or merge area 216 demarks the location where the number of lanes is reduced.

The automated ordering system comprises the order placement stations 210, 212, and 214, the computerized device 240, and one or more pay/pickup stations 220. The pay/pickup stations 220 can comprise a station where orders that are placed at order placement stations 210, 212, or 214 are picked up and potentially paid for.

The image capturing devices 230, 232, 234 work with the processor of the computerized device 240 to recognize the presence or absence of a vehicle at the order placement stations 210, 212, 214. There are several approaches for vehicle detection. For example, the processor may be used to train an image-based classifier. The classifier is applied frame-by-frame to the images captured by the image capturing device 230. In order to reduce the computational overhead a foreground detection method may be used to first determine when it is most likely that a vehicle is at one of the order placement stations 210, 212, 214. The classifier is then applied only when the foreground detection method suggests it is prudent to do so. Any of a number of types of detection methods could be used, including frame-differencing and background models (e.g. Gaussian mixture models). For example, vehicle detection may be performed by temporal differencing of frames. Other motion and foreground detection approaches such as those based on background estimation and subtraction, and optical flow can be used.

Object detection in video can be achieved via a number of different methods. Two common methods of motion detection used in applications that perform analytics on video data include frame-to-frame differencing and background estimation and subtraction ("background subtraction"). The frame differencing approach detects moving objects within the camera field of view by computing pixel-wise differences between successive frames in the video stream, typically requiring tuning to a very narrow range of object speed relative to the frame rate and camera geometry. By thresholding these differences, areas containing moving objects ("motion detected regions") can be easily identified.

Alternatively, model-based approaches for motion/foreground detection can be used. In some cases, the processor of the computerized device 240 performs the background subtraction approach. The background subtraction approach detects foreground objects rather than moving objects. However, moving objects also trigger foreground detection because their appearance differs from the background estimate. For example, when an image of the background, without any foreground objects, is available, a model is trained to estimate common pixel values. Mainly, background subtraction computes the absolute intensity/color difference between the known or estimated background model and each current frame in the video sequence. By comparing each current frame to the background model, the pixels of which the computed distance in the intensity/color space does not meet a predetermined threshold value are classified as background pixels and the pixels of which the computed distance in the intensity/color space meets and exceeds the threshold (i.e., do not fit the existing background model) are classified as foreground pixels. The detected foreground pixels indicate a foreground object/motion detected region.

Strategies used to maintain a background model or estimate include a historical statistical model (e.g., a parametric descriptor density model, such as, Gaussian Mixture Models (GMM) based approach or a non-parametric descriptor density model, such as, a kernel-based estimate) for each pixel is constructed, eigenbackgrounds (which use principal component analysis), computation of running averages (that gradually update the background after each next frame), and median filtering, etc. The background models are typically adjusted dynamically to account for slow variations in the background of the scene. In the contemplated embodiment, the background estimate can be continuously updated with each incoming frame at a rate controlled by a predetermined learning rate factor. However, embodiments are contemplated where the background estimate can be updated at slower rates. Other alternatives are also contemplated for constructing the current background model.

A binary mask/difference image (i.e., a foreground object mask) is generated using the pixel classifications. In one embodiment, a morphological operation that is understood in the art can be applied to the difference image to filter out sources of fictitious motion and to accurately detect pixels associated with foreground or moving objects. An example filtering technique can include applying dilation and closing operations to fill in holes in the binary mask and to bridge small gaps in regions where an object has been erroneously split into a number of smaller, separate foreground elements. Connected component analysis (CCA) can also be used to eliminate small, extraneous regions where motion is detected in the binary mask. These motion detected regions can result from foreground objects that are too small to be of interest (e.g., a bird flying through the scene) or from general image noise. Common features used in the CCA screening are object area, angle of orientation, and fill density.

Figure 3:
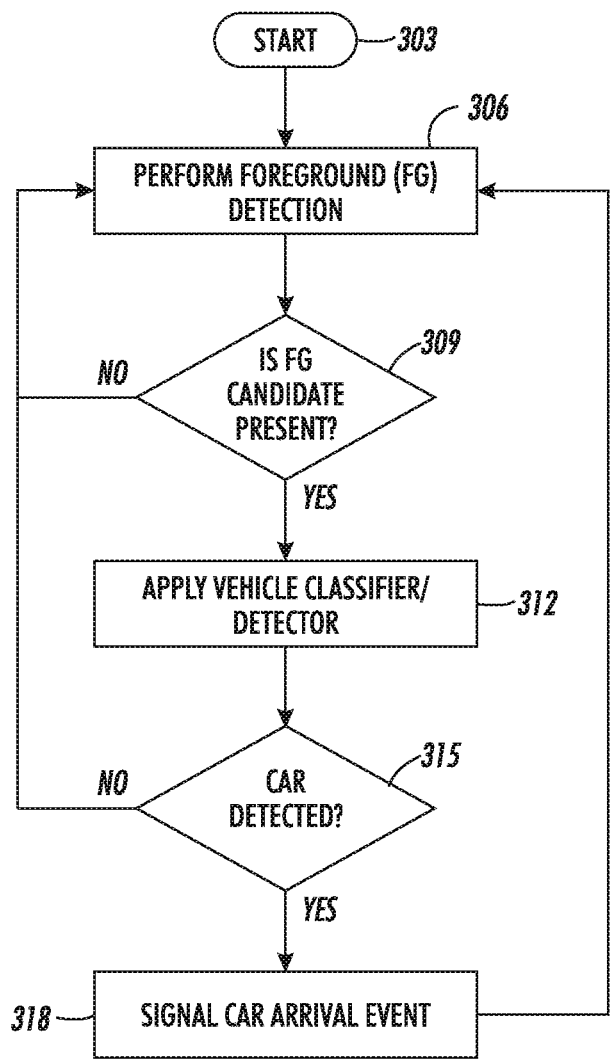
FIG. 3 is a flow diagram of a vehicle detection method according systems and methods herein.

FIG. 3 shows a flowchart of an exemplary vehicle detection process. The process starts at 303 and proceeds immediately to element 306, where foreground detection is performed. At 309, a check is made to determine if a foreground candidate is present. If not, the process reverts to 306 to continuously check for a foreground candidate. If a foreground candidate is present at 309, the process continues to 312 to classify what has been detected. At 315, a check is made to determine if a vehicle (car) has been detected. If not, the process reverts to 306 to continuously check for a foreground candidate. If a vehicle is present at 315, the process continues to 318 to signal a car arrival event. While specific vehicle detection methods are discussed herein, the concepts of the present disclosure are not limited to any specific vehicle detection strategy. Other methods, whether now known or developed in the future, may be used.

Figure 4:
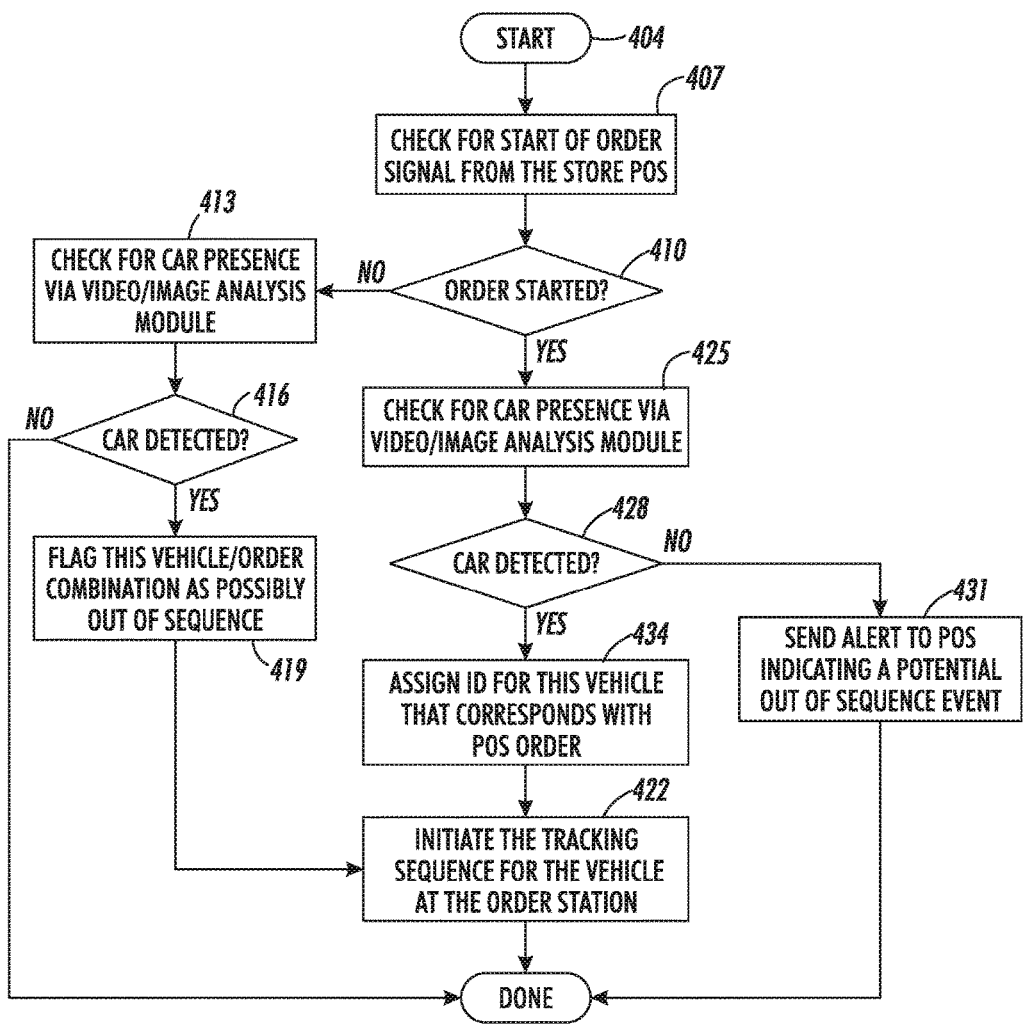
FIG. 4 is a flow diagram illustrating various methods herein.

FIG. 4 is a flowchart of operations involving arrival alerts, according to systems and methods herein. Here classification yields a signal that indicates whether a vehicle is appropriately at the order entry station, as assumed, when the order start signal is received. If an order is started when there is no car detected at the order entry station, then an alert signal is sent to the ordering system to warn the crew that an out of sequence event is likely to occur. If no order has been started, but a vehicle is detected at the order station via the image-based classification method, then the vehicle is tracked but flagged as possibly out of sequence. If an appropriate order entry signal is received for this vehicle then no out of sequence event signal is generated.

Specifically, the process starts at 404 and proceeds immediately to element 407. At 407, the automated ordering system checks to determine if a 'start of order' signal has been received. At 410, it is determined if an order has been started. If an order has not been started at 410, the process continues to 413 to check for the presence of a vehicle (car), at the order station. At 416, if a vehicle (car) has not been detected (and no order has been started) this portion of the process ends. If, at 416, a vehicle (car) has been detected at the order station (and an order has not been started), the process continues to 419. At 419, the vehicle (car) is flagged as possibly out of sequence, and the process continues to 422. At 422, tracking of the vehicle (car) at the order station is initiated. If, at 410, an order has been started, the process continues to 425 to check for the presence of a vehicle (car) at the order station. At 428, if a vehicle (car) has not been detected (and an order has been started), the process continues to 431, where an alert is sent to the ordering system indicating a potential out of sequence event. If, at 428, a vehicle (car) has been detected at the order station (and an order has been started), the process continues to 434. At 434, an identification code is assigned to the vehicle (car) corresponding to the order in the ordering system. At 422, tracking of the vehicle (car) at the order station and the associated order is initiated.

Figure 5:
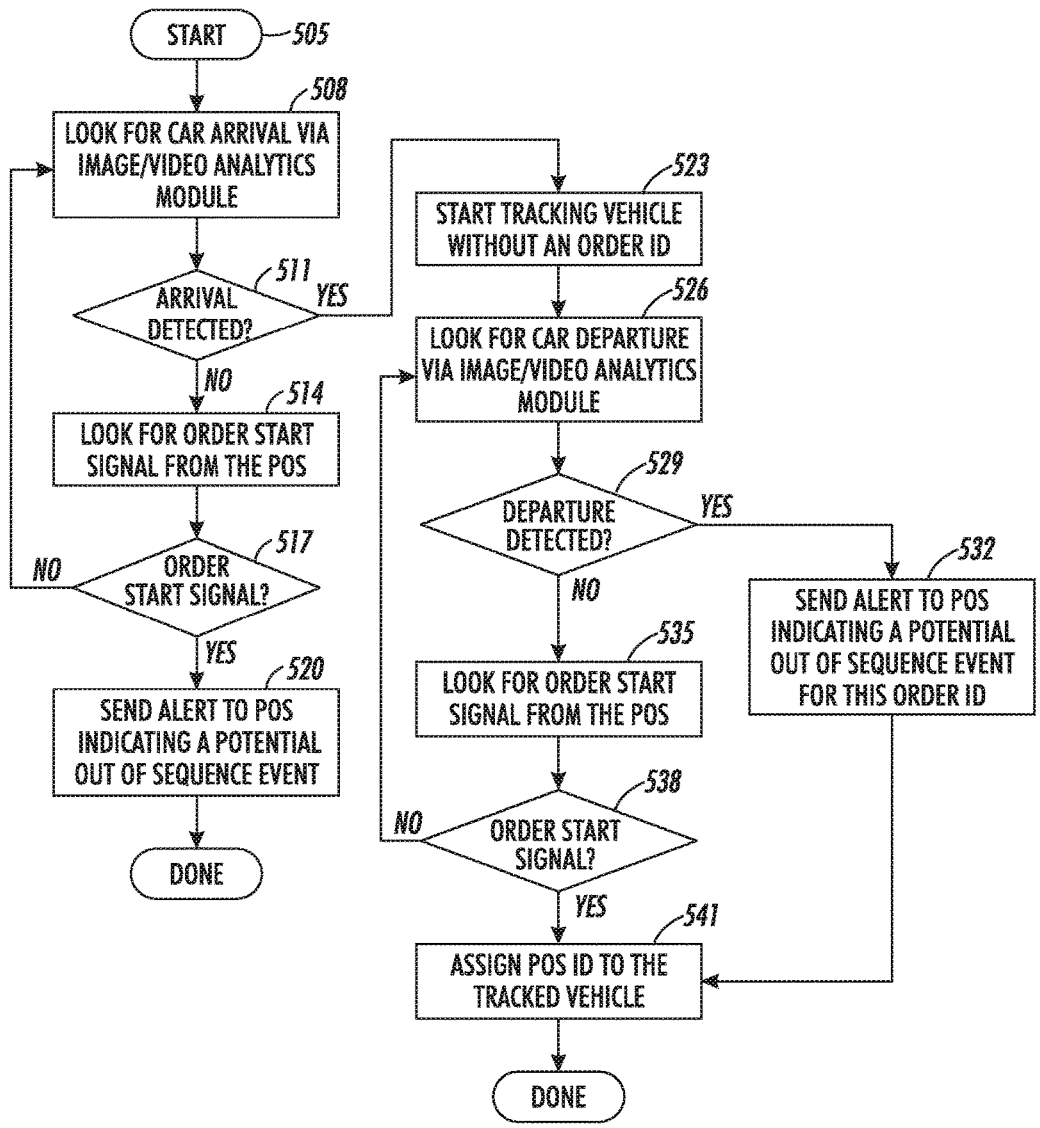
FIG. 5 is a flow diagram illustrating various methods herein.

FIG. 5 is a flowchart of operations that leverages the image-based classifier to detect both arrival and departure of vehicles at the order stations, according to systems and methods herein. In particular, the process starts at 505 and proceeds immediately to element 508. At 508, the automated ordering system checks to determine if a vehicle has arrived at the ordering station. At 511, it is determined if vehicle arrival at the ordering station has been detected. If vehicle arrival has not been detected at 511, the process continues to 514 to check for an order start signal in the ordering system. At 517, it is determined if an order start signal is in the ordering system. If not, the process reverts to 508 to continuously check for arrival of a vehicle at the ordering station. If the order start signal is present at 517, the process continues to 520 to send an alert to the ordering system indicating a potential out of sequence event. If, at 511, vehicle arrival has been detected, the process continues to 523. At 523, the ordering system begins tracking the vehicle without an order. At 526, the automated ordering system checks to determine if the vehicle has departed from the ordering station. At 529, it is determined if vehicle departure from the ordering station has been detected. If vehicle departure has been detected at 529, the process continues to 532 to send an alert to the ordering system indicating a potential out of sequence event. If, at 529, vehicle departure has been detected, the process continues to 535. At 535, it is determined if an order start signal is in the ordering system. If an order has not been started at 538, the process reverts to 526 to continue to check for the vehicle departure from the ordering station. If, at 538, vehicle departure has been detected, the process continues to 541. At 541, an order identification is associated with the vehicle being tracked in the ordering system.

In other words, the vehicle detection signal is evaluated with respect to the presence or absence of an order start signal from the automated ordering system to determine whether or not an out of sequence event is likely (and whether or not to generate a warning to the crew).

Figure 6A:
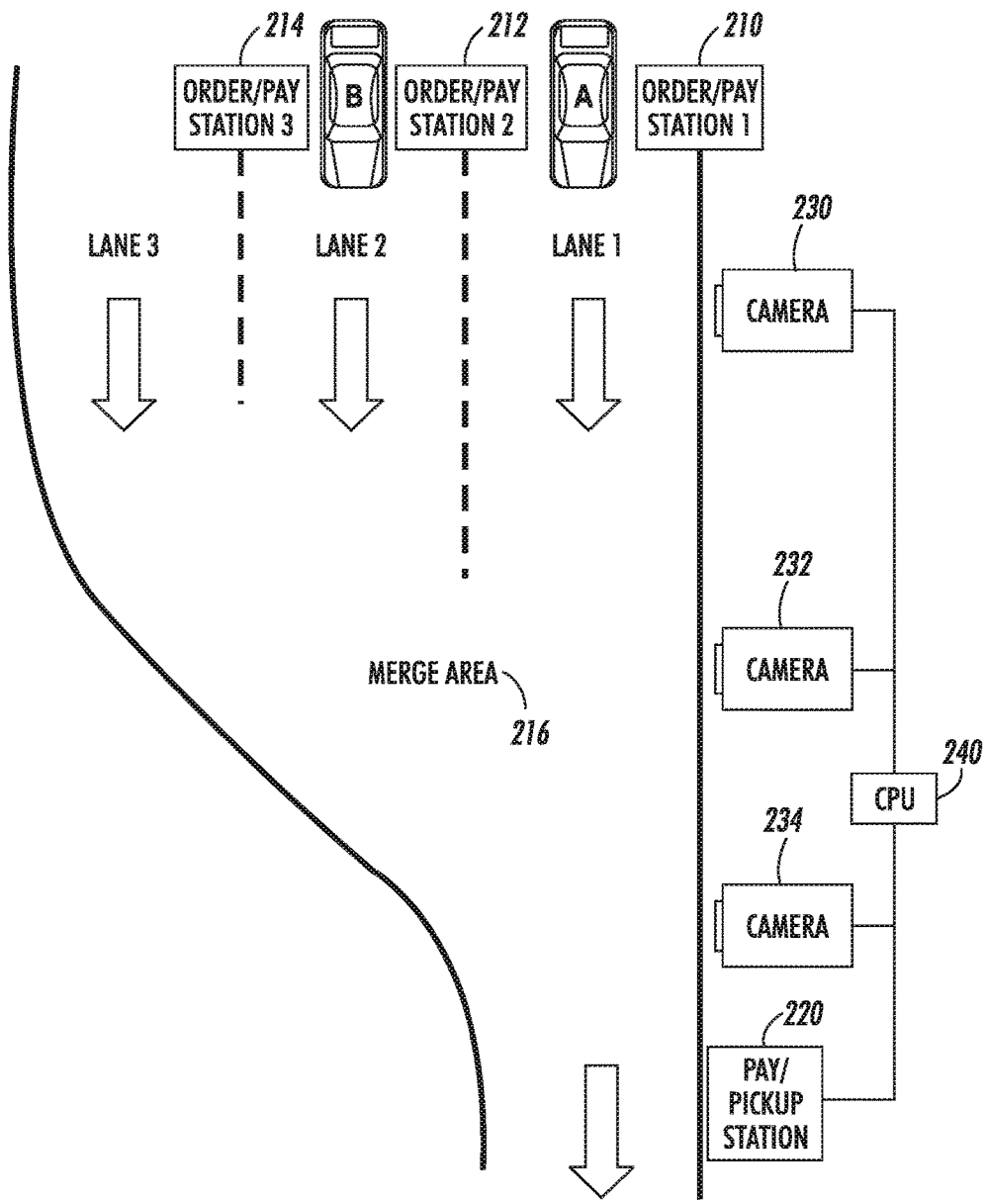
FIGS. 6A-6C illustrate vehicles in sequence according to systems and methods herein.
Figure 6B:
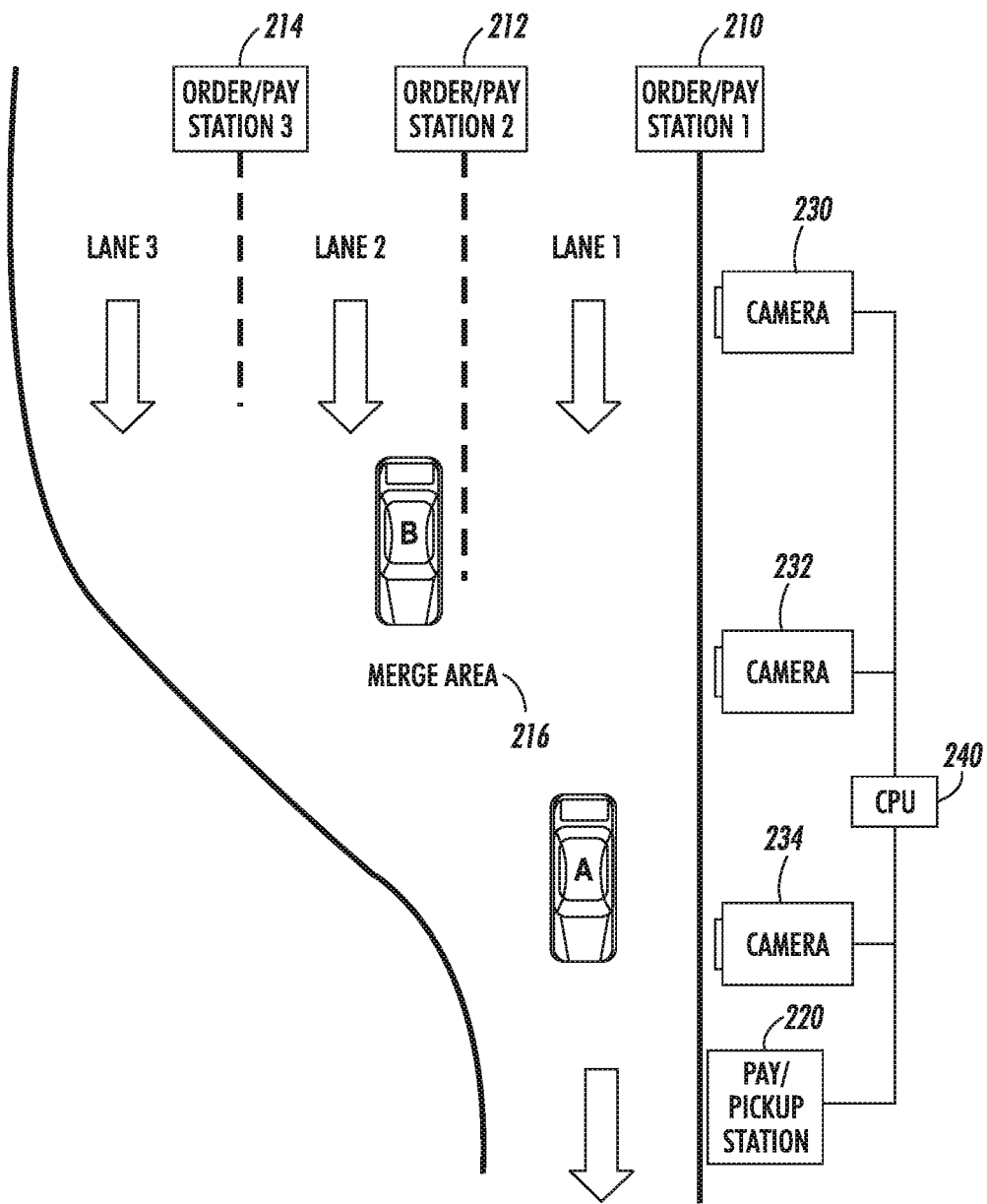
Figure 6C:
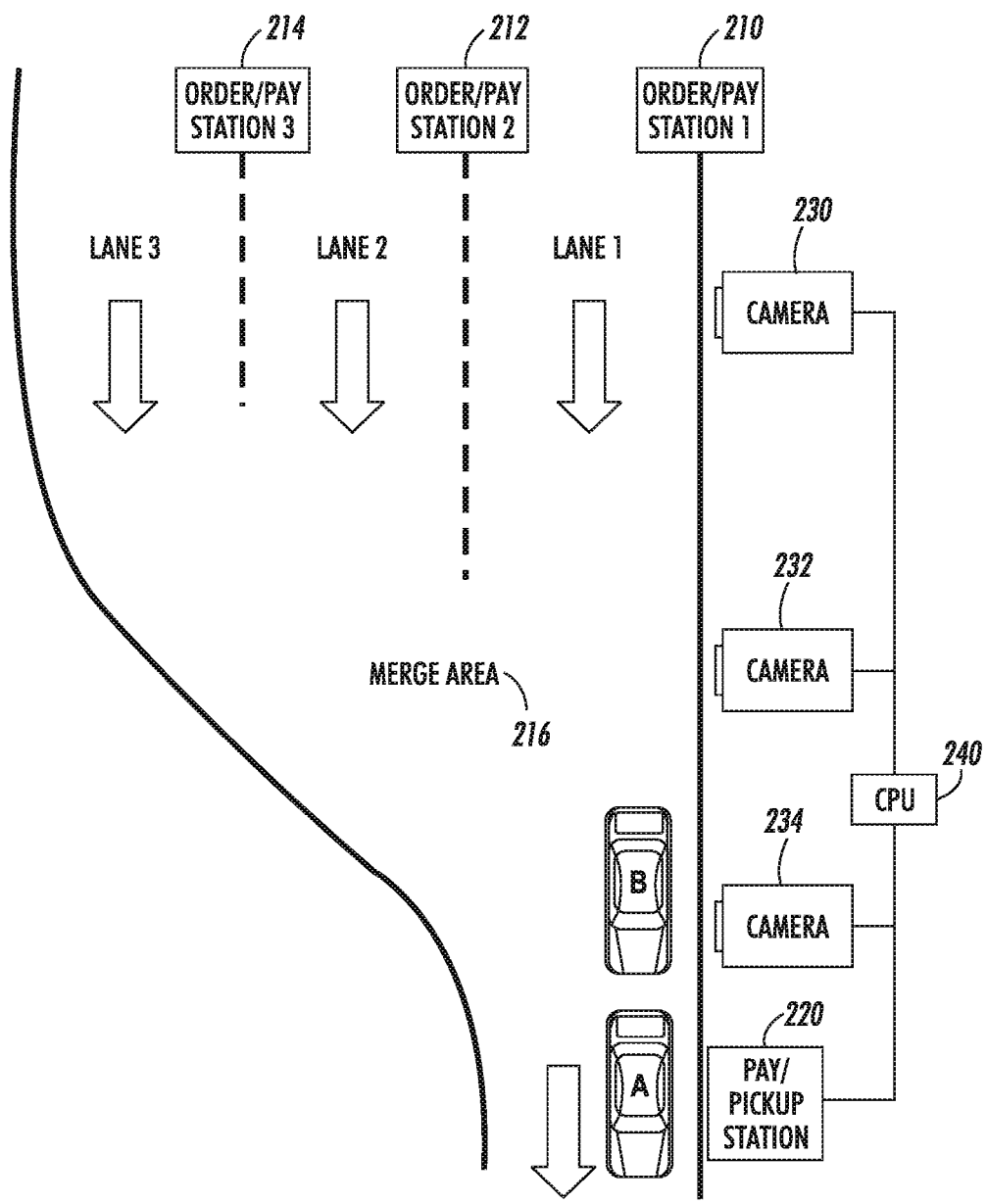
Figure 7:
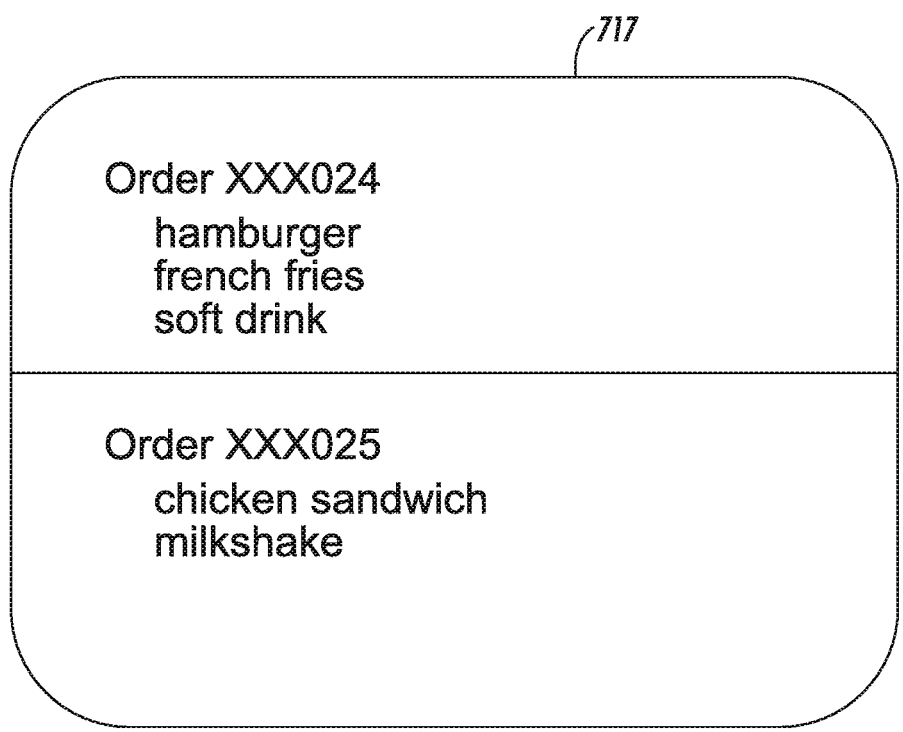
FIG. 7 illustrates a user interface.

FIG. 6A shows two vehicles at side-by-side ordering stations. Vehicle A is detected at Order/Pay Station 1 (210) and Vehicle B is detected at Order/Pay Station 2 (212). Vehicle A initiates the first order start signal and departs the ordering station first. Vehicle B initiates the second order start signal and departs the ordering station second. FIG. 6B shows the two vehicles, Vehicle A and Vehicle B, departing the ordering station in the same sequence as the order received in the ordering system. FIG. 6C shows the two vehicles, Vehicle A and Vehicle B, in the correct sequence for payment and pickup of the respective orders at the Pay/Pickup station 220. FIG. 7 shows a user interface 717 of the ordering system at the pickup station, associated with the scenario illustrated in FIGS. 6A-6C, in which order XXX024 is associated with Vehicle A and order XXX025 is associated with Vehicle B.

Figure 8A:
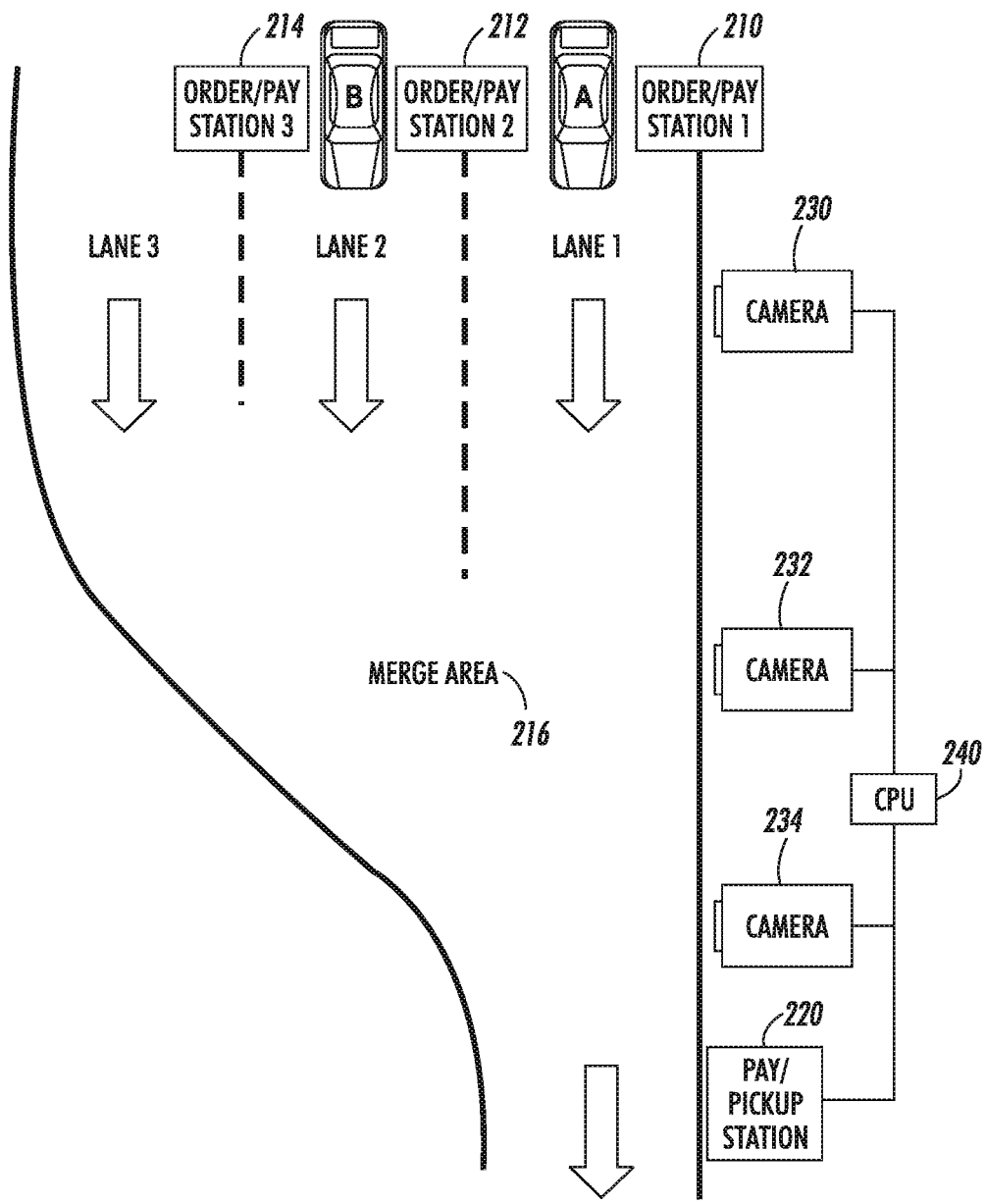
FIGS. 8A-8B illustrate vehicles out of sequence according to systems and methods herein.
Figure 8B:
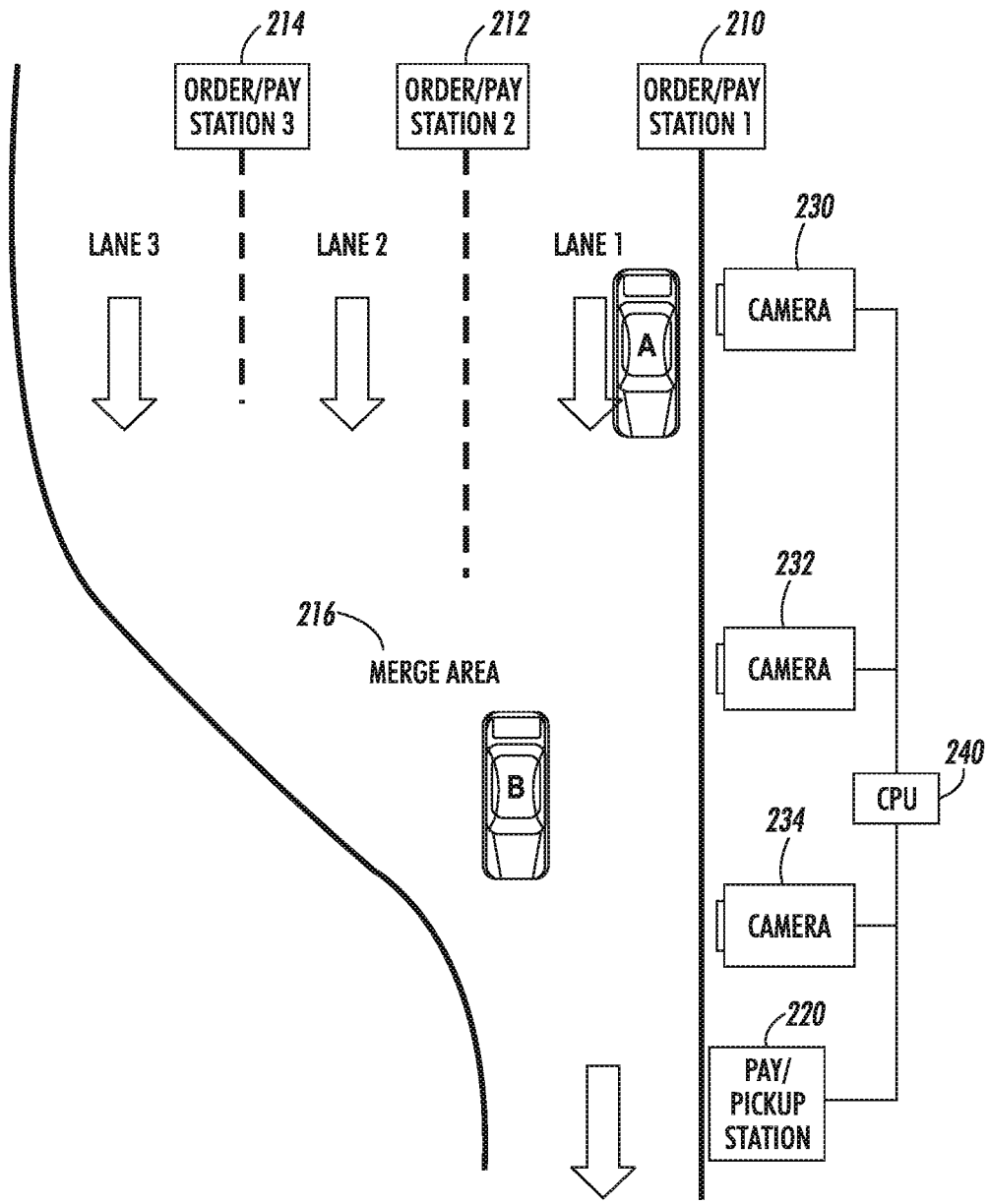
Figure 9:
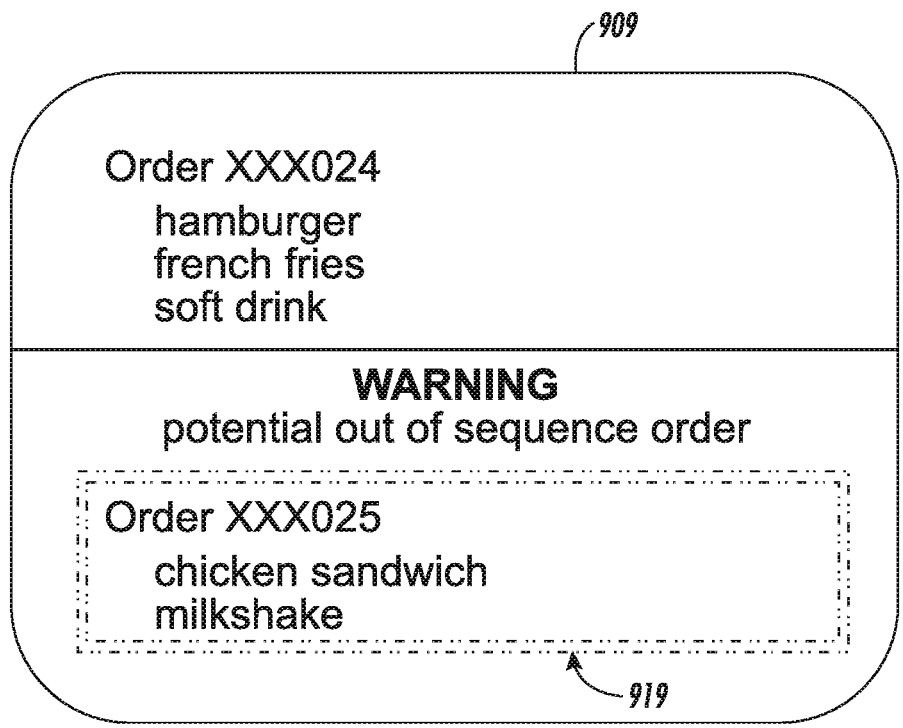
FIG. 9 illustrates a user interface showing a warning message.

FIG. 8A shows two vehicles at side-by-side ordering stations. Vehicle A is detected at Order/Pay Station 1 (210) and Vehicle B is detected at Order/Pay Station 2 (212). Vehicle A initiates the first order start signal and Vehicle B initiates the second order start signal. However, in this exemplary scenario, Vehicle B departs the ordering station first and Vehicle A departs the ordering station second, as shown in FIG. 8B. FIG. 9 shows a user interface 909 of the ordering system associated with the scenario illustrated in FIGS. 8A-8B showing a warning message 919 for a crewmember. The warning may be visual, as shown in FIG. 9. Alternatively, or in addition, the warning may be audible from the automated ordering system and/or in a headset worn by the crewmember.

Figure 10:
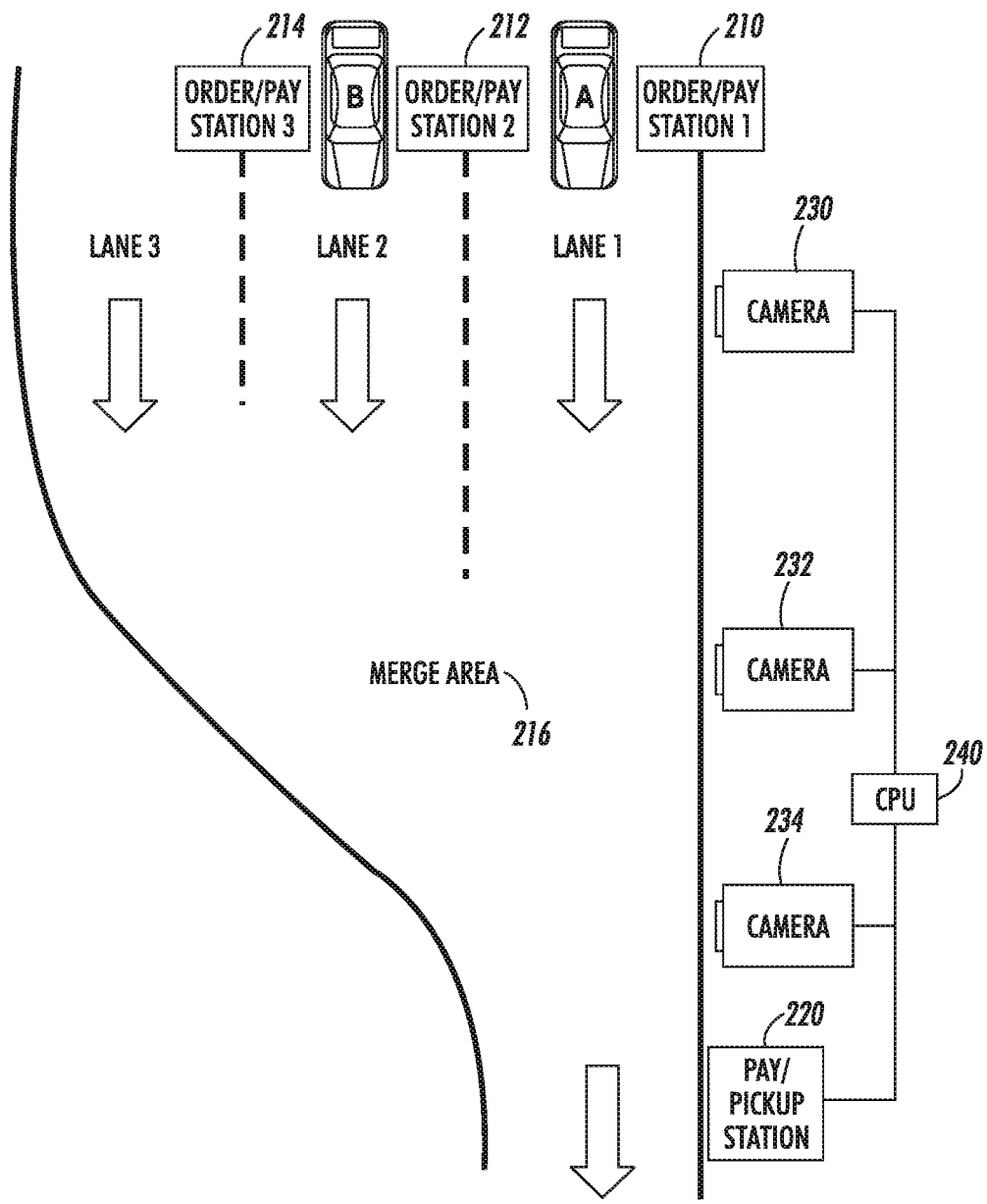
FIG. 10 illustrate vehicles out of sequence according to systems and methods herein.
Figure 11:
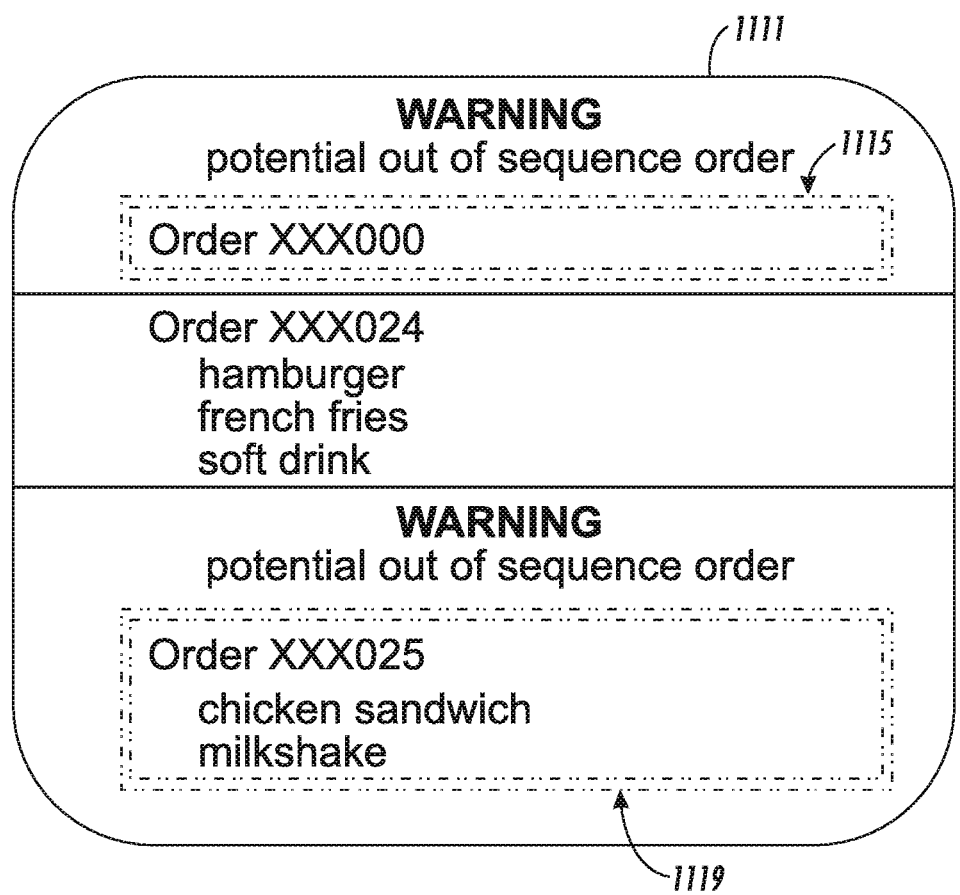
FIG. 11 illustrates a user interface.

FIG. 10 shows two vehicles at side-by-side ordering stations. Vehicle A is at Order/Pay Station 1 (210), but not detected by the ordering system. Vehicle B is detected at Order/Pay Station 2 (212). In this exemplary scenario, an order start signal is received from Order/Pay Station 3 (214), where no vehicle is detected, in addition to order start signals from Order/Pay Station 1 (210) and Order/Pay Station 2 (212). FIG. 11 shows a user interface 1111 of the ordering system associated with this scenario, showing two warning messages: one for the order from lane 3 without a vehicle (1115), and one for lane 1 where Vehicle A is not detected (1119).

As mentioned above, the vehicle detection can be performed in various ways. In one example, the vehicle detection is performed via motion detection (such as frame-to-frame differences, optical flow, etc.) followed by morphological filtering and size thresholding. This approach has a computational advantage, which can be well suited for real-time implementation. However, such an approach may lose ground when a moving object is viewed that is about the size of vehicle in pixels (can be a small object in front of the camera or a huge object very far away). This is not common and is easily solved in practice by limiting the operation depth range of the stereo camera and an effective use of vision-based object recognition methods.

In another example, a vision-based object recognition method can be applied frame-to-frame. This yields robust vehicle detection but at a much higher computation cost, which adds a challenge in meeting real-time implementation speeds. Yet another example is a mix of motion detection, object recognition, and tracking methods for vehicle detection. In this case, the first occurrence of motion detection will trigger object recognition. If vehicle recognition is confirmed, object tracking is used for the future frames until the object leaves the scene. If vehicle recognition is not confirmed, motion detection will continue for the next frame and the process is repeated.

The lane determination can determine the source lane of the vehicle of interest prior to entering the merging lane. The source lane is determined by finding the distance of the side of the vehicle of interest to the sensor (i.e., the distance of a detected vehicle) and matching that to the distance that the different lanes are located relative to the camera.

A temporal view of lane information for vehicles approaching the merging lane, as presented above, is usually sufficient for maintaining the correct vehicle order. However, there is the potential for issues to arise due to certain noises or customer behavior (cut ins, pedestrians, drive aways, etc.). For that purpose, other features such as color, shape, height, width at the merging location, can be collected in order to compare such image features obtained using multiple camera positioned near the order completion area (e.g., order pick-up window).

Thus, exemplary systems herein include an image capturing device 230, which may comprise a camera, aimed at multiple order placement stations 210, 212, 214, and another image capturing device 232, which may comprise another camera, aimed at a first location, such as merge area 216. The first location comprises, for example, a horizontal surface having multiple parallel primary lanes, such as lanes 200, 202, 204 merging into a reduced number of secondary lanes, such as a single merge lane 206. In this example, the image capturing device 232 may comprise a stereo camera having multiple cameras that are positioned relative to each other in a horizontal plane, approximately parallel to the horizontal surface of the lanes 200, 202, 204. Moving items (e.g., any type of items, such as vehicles, goods, persons, persons within vehicles, etc.) within the lanes 200, 202, 204 initiate transactions, and complete the transactions while in the merge lane 206.

A processor of a computerized device 240 is operatively connected to the image capturing devices 230, 232. The processor detects vehicles in the ordering stations based on differences between images of the items obtained by the multiple cameras.

This identifies in which of the lanes 200, 202, 204 each of the moving items was located before merging into the merge lane 206 and allows the processor to order the transactions in a "merge order." The merge order corresponds to the sequence in which the moving items entered the merge lane 206 from the lanes 200, 202, 204. An interface in the computerized device 240 is operatively connected to the processor, and the interface outputs the transactions (in the merge order) to a transaction device at the pay/pickup stations 220 to complete the transactions.

Figure 12:
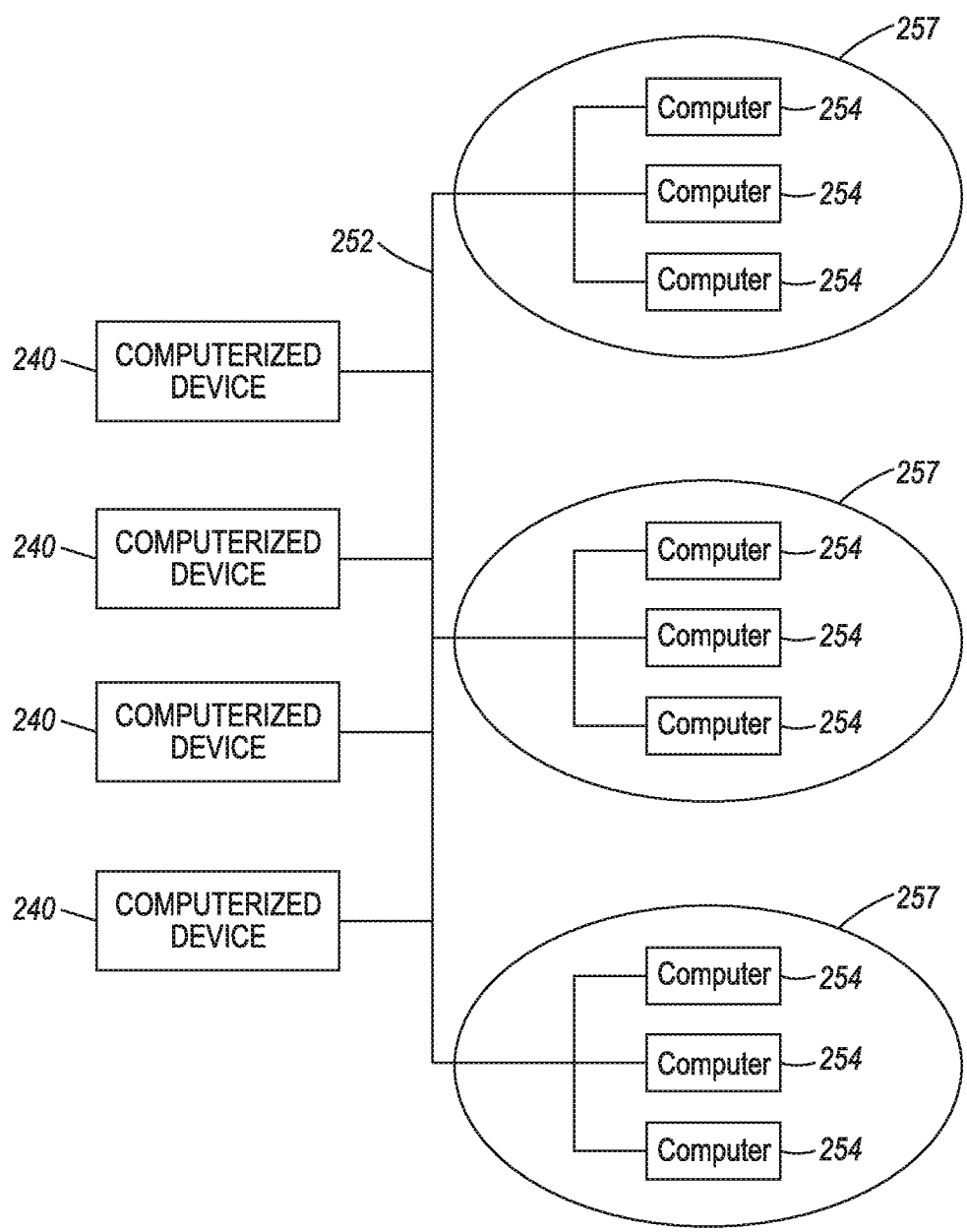
FIG. 12 is a schematic diagram illustrating systems herein.

As shown in FIG. 12, exemplary system systems and methods herein include various computerized devices 240, 254 located at various different physical locations 257. The computerized devices 240, 254 can include print servers, printing devices, personal computers, etc., and are in communication (operatively connected to one another) by way of a local or wide area (wired or wireless) network 252. Therefore, the processing does not need to be done locally at the location of the image capturing devices, but can be performed using a centralized processing system connected to the stereo camera(s) through the network 252.

Figure 13:
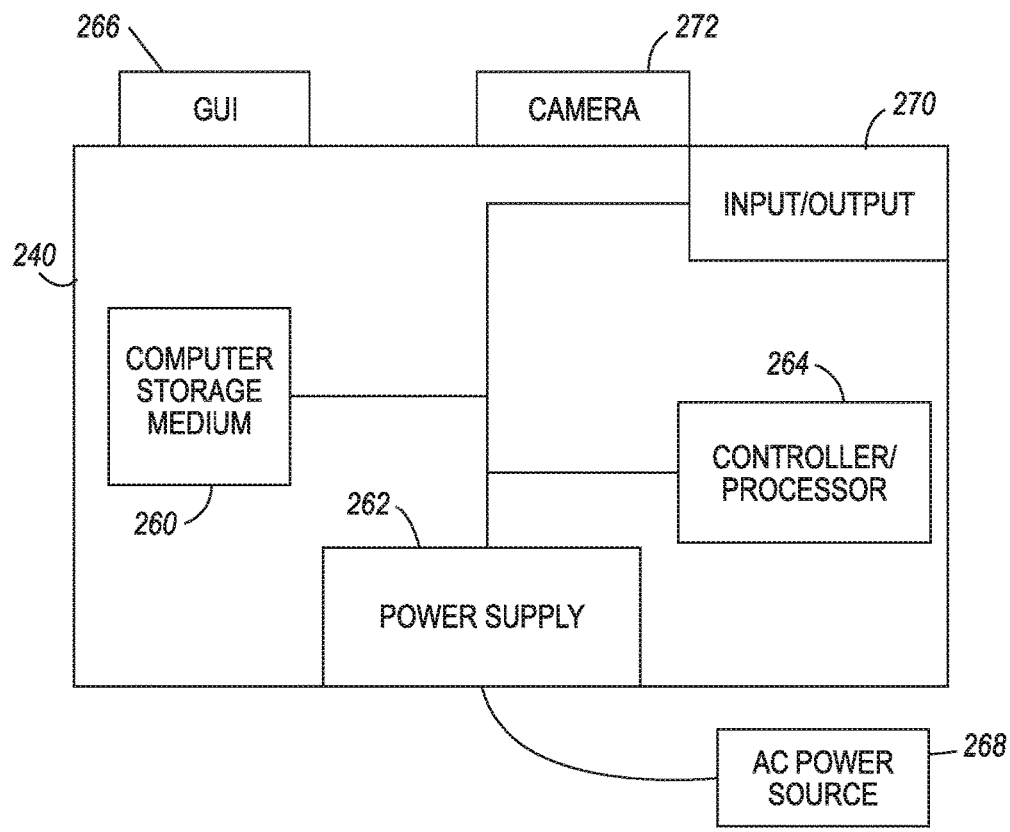
FIG. 13 is a schematic diagram illustrating devices herein.

FIG. 13 illustrates one exemplary configuration of the computerized device 240, which can be used with systems and methods herein and can comprise, for example, a server, a personal computer, a portable computing device, etc. The computerized device 240 includes a controller/processor 264 and an input/output device 270, such as a communications port, operatively connected to the controller/processor 264 and to the computerized network 1252 external to the computerized device 240. Also, the computerized device 240 can include at least one accessory functional component, such as a user interface assembly (GUI) 266, camera 272, etc., that operate on the power supplied from the external power source 268 (through the power supply 262).

The input/output device 270 is used for communications to and from the computerized device 240. The controller/processor 264 controls the various actions of the computerized device 240. A non-transitory computer storage medium device 260 (which can be optical, magnetic, capacitor based, etc.) is readable by the controller/processor 264 and stores instructions that the controller/processor 264 executes to allow the computerized device 240 to perform its various functions, such as those described herein. The power supply 262 can comprise a power storage element (e.g., a battery, etc.).

Figure 14:
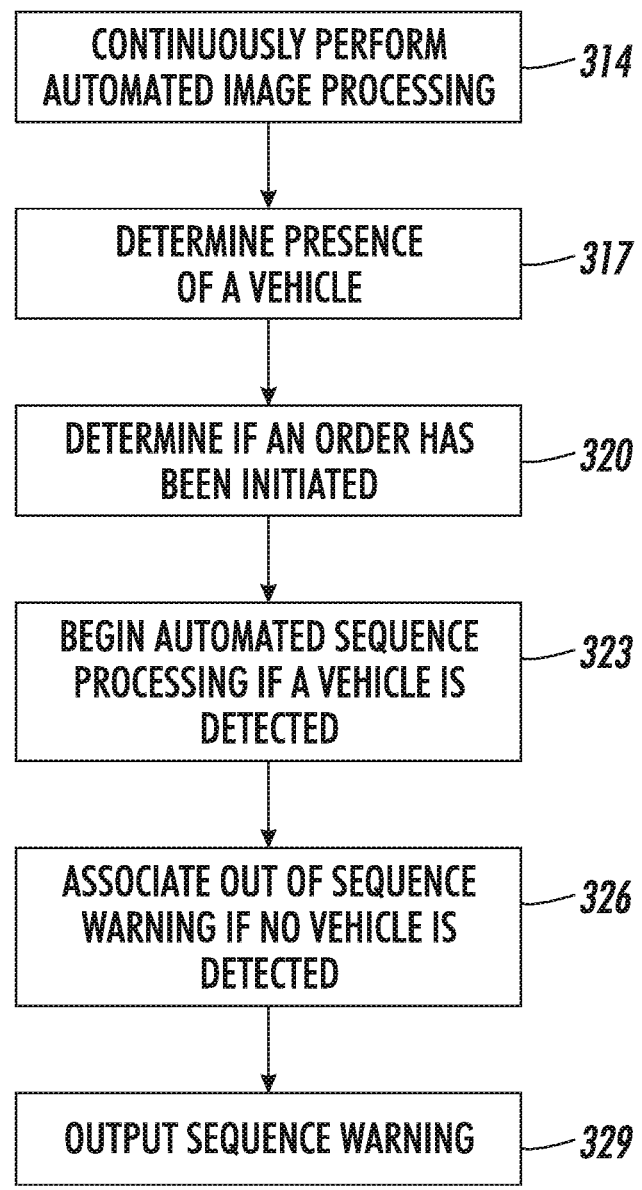
FIG. 14 is a flow diagram of various methods herein.

FIG. 14 is flowchart illustrating exemplary methods herein. In item 314, these methods continually perform automated image processing of images from order locations of a multi-lane drive-thru system, using an automated ordering system. The images can be obtained using a single camera having multiple imaging units, or a camera network having multiple cameras. The multiple cameras of a camera network (or imaging devices of a stereo camera) may have fields of views that overlap multiple order locations.

In item 317, the presence of a vehicle at any of the order locations of the multi-lane drive-thru system is automatically determined based on the automated image processing.

In item 320, it is automatically determined if an order has been initiated into the automated ordering system.

When the order has been initiated while the vehicle is present at any of the order locations, an automated sequencing processing of the automated ordering system is automatically begun, in item 323. The automated sequencing processing determines an order pick-up sequence for picking up orders at one or more pickup windows of the multi-lane drive-thru system.

When the order has been initiated while the vehicle is not present at any of the order locations, a potential out-of-sequence warning is automatically associated with the order, in item 326.

In item 329, the potential out-of-sequence warning is output from the automated ordering system.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

It should be understood that the terminology used herein is for the purpose of describing the disclosed embodiments and is not intended to be limiting. For example, as used herein, the singular forms "a", "an" and "the" are intended to include the plural forms as well, unless the context clearly indicates otherwise. Additionally, as used herein, the terms "comprises", "comprising", "includes", and/or "including" specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method, comprising:
    acquiring images using one or more image capturing devices aimed at order placing locations of a multi-lane drive-thru system, said order placing locations comprising multiple primary lanes merging into a reduced number of at least one secondary lane, said at least one secondary lane comprising one or more pickup windows, said one or more pickup windows being separate from said order placing locations;
    continually performing automated image processing of said images from said order placing locations of said multi-lane drive-thru system, using an automated ordering system operatively connected to said one or more image capturing devices;
    automatically determining if a vehicle is present at any of said order placing locations of said multi-lane drive-thru system based on said automated image processing, using said automated ordering system;
    automatically determining if an order has been initiated into said automated ordering system;
    when said order has been initiated into said automated ordering system while said vehicle is present at any of said order placing locations:
        automatically associating said order with said vehicle and tracking said vehicle, using said automated ordering system, and
        automatically beginning an automated sequencing processing of said automated ordering system, said automated sequencing processing determining an order pick-up sequence for picking up orders at said one or more pickup windows;
    outputting said order pick-up sequence using an interface at said one or more pickup windows, said interface being operatively connected to said automated ordering system; and
    when said order has been initiated while no vehicle is present at any of said order placing locations, automatically associating a potential out-of-sequence warning with said order, and outputting said potential out-of-sequence warning using said interface.

2. The method according to claim 1, further comprising:
    automatically determining if said vehicle has left said order placing locations of said multi-lane drive-thru system based on said automated image processing, using said automated ordering system.

3. The method according to claim 1,
    wherein said image capturing devices comprise one or more cameras having a field of view directed toward said order placing locations of said multi-lane drive-thru system.

4. The method according to claim 1, further comprising:
    detecting a presence of vehicles at said order placing locations of said multi-lane drive-thru system based on at least one of motion detection and vision-based object recognition.

5. The method according to claim 1, said tracking said vehicle further comprising:
    using said one or more image capturing devices and automated image processing to confirm the order of vehicles merging from said multiple primary lanes into said reduced number of at least one secondary lane.

6. The method according to claim 5, further comprising:
    assigning a vehicle identification corresponding to said order in said automated ordering system.

7. A system, comprising:
    a multi-lane drive-thru system having order placing locations, said order placing locations comprising multiple primary lanes merging into a reduced number of at least one secondary lane, said at least one secondary lane comprising one or more pickup windows, said one or more pickup windows being separate from said order placing locations;
    an image capturing device obtaining images from said order placing locations of said multi-lane drive-thru system;
    a processor connected to said image capturing device, said processor performing automated image processing of said images from said order placing locations of said multi-lane drive-thru system; and
    an automated ordering system connected to said processor,
        said image capturing device continuously monitoring said order placing locations of said multi-lane drive-thru system,
        said processor automatically determining if a vehicle is present at any of said order placing locations of said multi-lane drive-thru system based on said automated image processing of said images,
        said processor automatically determining if an order has been initiated into said automated ordering system,
        when an order has been initiated while said vehicle is present at any of said order placing locations:
            said processor automatically associating said order in said automated ordering system with said vehicle and tracking said vehicle, and
            said processor automatically beginning an automated sequencing processing of said automated ordering system, said automated sequencing processing determining an order pick-up sequence for picking up orders at said one or more pickup windows of said multi-lane drive-thru system,
        said processor outputting said order pick-up sequence using an interface at said one or more pickup windows, said interface being operatively connected to said automated ordering system, and when said order has been initiated while no vehicle is present at any of said order placing locations, said processor automatically associating a potential out-of-sequence warning with said order, and outputting said potential out-of-sequence warning from said automated ordering system using said interface at said one or more pickup windows.

8. The system according to claim 7, said processor automatically determining if said vehicle has left said order placing locations of said multi-lane drive-thru system based on said automated image processing, using said automated ordering system.

9. The system according to claim 7, said processor detecting a presence of vehicles at said order placing locations of said multi-lane drive-thru system based on at least one of motion detection and vision-based object recognition.

10. The system according to claim 7, further comprising:
said processor using said image capturing device and automated image processing to confirm the order of vehicles merging from said multiple primary lanes into said reduced number of at least one secondary lane.

11. The system according to claim 10, said processor assigning a vehicle identification corresponding to said order in said automated ordering system.

12. The system according to claim 7, said image capturing device comprising one or more cameras having a field of view directed toward said order placing locations of said multi-lane drive-thru system.

13. A method comprising:
receiving an order into a system of an establishment having a multi-lane vehicle drive-thru operation;
automatically obtaining an image of an order location at said establishment using an image capturing device of said system when said order is entered into said system;
automatically, by said system, determining whether a vehicle is within said image by comparing said image to known images;
automatically, by said system, associating said vehicle with said order and placing said order in sequence with other orders based on said vehicle being within said image obtained when said order was entered; and
automatically, by said system, outputting a warning at a pick-up location of said establishment that said order is potentially out of sequence with said other orders based on said vehicle not being within said image obtained when said order was entered.

14. The method in claim 13, wherein said image is obtained when said order is started to be entered into said system.

15. The method in claim 13, wherein said determining whether said vehicle is within said image is performed by comparing a sequence of images for differences to determine whether motion is detected at said order location.

16. The method in claim 15, further comprising:
automatically, by said system, determining whether said vehicle has arrived and departed from said order location before said order was entered by determining whether said motion was detected at said order location; and automatically, by said system, outputting said warning that said order is potentially out of sequence with said other orders based on said vehicle departing before said order was entered.

17. The method in claim 13, wherein said determining whether said vehicle is within said image is performed by comparing foreground and background portions of said image.

18. The method in claim 13, wherein said receiving said order comprises receiving input into said system from an employee of said establishment in communication with a customer of said establishment at said order location.

19. A system of an establishment having a multi-lane vehicle drive-thru operation, said system comprising:
a processor;
an order input device operatively connected to said processor; and
an image capturing device operatively connected to said processor and positioned at an order location at said establishment,
wherein said order input device receives an order,
wherein said image capturing device is adapted to automatically obtain an image of said order location when said order is entered into said order input,
wherein said processor is adapted to automatically determine whether a vehicle is within said image by comparing said image to known images,
wherein said processor is adapted to automatically associate said vehicle with said order and place said order in sequence with other orders based on said vehicle being within said image obtained when said order was entered, and
wherein said processor is adapted to automatically output a warning at a pick-up location of said establishment that said order is potentially out of sequence with said other orders based on said vehicle not being within said image obtained when said order was entered.

20. The system in claim 19, wherein said image capturing device is adapted to automatically obtain said image when said order is started to be entered into said order input device.

21. The system in claim 19, wherein said processor is adapted to automatically determine whether said vehicle is within said image by comparing a sequence of images for differences to determine whether motion is detected at said order location.

22. The system in claim 21, wherein said processor is adapted to automatically determine whether said vehicle has arrived and departed from said order location before said order was entered by determining whether said motion was detected at said order location, and
wherein said processor is adapted to automatically output said warning that said order is potentially out of sequence with said other orders based on said vehicle departing before said order was entered.

23. The system in claim 19, wherein said processor is adapted to automatically determine whether said vehicle is within said image by comparing foreground and background portions of said image.

24. The system in claim 19, wherein said order input device is adapted to receive said order by receiving input from an employee of said establishment in communication with a customer of said establishment at said order location.

* * * * *